(12) United States Patent
Carson (10) Patent No.: US 8,300,345 B2
(45) Date of Patent: Oct. 30, 2012

(54) VARIABLE TRACK WIDTH RECORDING COMPENSATION

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 49 days.

(21) Appl. No.: 12/631,503

(22) Filed: Dec. 4, 2009

(65) Prior Publication Data
US 2010/0142087 A1    Jun. 10, 2010

Related U.S. Application Data

(60) Provisional application No. 61/119,943, filed on Dec. 4, 2008.

(51) Int. Cl.
*G11B 7/00* (2006.01)
(52) U.S. Cl. ............... 360/55; 360/99.08; 360/73.08
(58) Field of Classification Search ............ 360/69, 360/99.08, 55, 73.08
See application file for complete search history.

(56) References Cited

U.S. PATENT DOCUMENTS

| | | | |
|---|---|---|---|
| 3,701,847 A | 10/1972 | Miyauchi et al. | |
| 4,107,729 A * | 8/1978 | Otobe et al. | 386/339 |
| 4,780,866 A * | 10/1988 | Syracuse | 369/59.14 |
| 5,526,328 A * | 6/1996 | Oshima et al. | 369/13.02 |
| 5,854,722 A | 12/1998 | Cunningham et al. | |
| 6,243,350 B1 | 6/2001 | Knight et al. | |
| 6,577,463 B1 | 6/2003 | Frees et al. | |
| 6,636,460 B2 | 10/2003 | Akiyama et al. | |
| 7,218,470 B2 | 5/2007 | Deeman et al. | |
| 7,359,305 B2 | 4/2008 | Tsukuda et al. | |
| 2004/0231531 A1 * | 11/2004 | Edwards et al. | 101/22 |
| 2005/0078402 A1 * | 4/2005 | Khor et al. | 360/75 |
| 2005/0219737 A1 * | 10/2005 | Fukushima et al. | 360/77.08 |
| 2010/0002330 A1 * | 1/2010 | Lille | 360/59 |

OTHER PUBLICATIONS

Teck B. Goh, Zhongming Li, Ben M. Chen, Tong Heng Lee and Tony Huang, "Design and Implementation of a Hard Disk Drive Servo System Using Robust and Perfect Tracking Approach," IEEE Transactions on Control Systems Technology, Mar. 2001, pp. 221-233, vol. 9, No. 2.

* cited by examiner

*Primary Examiner* — Latanya Bibbins
(74) *Attorney, Agent, or Firm* — Hall Estill Attorneys at Law (57) ABSTRACT

Method and apparatus for providing a storage medium with variable track widths. In accordance with various embodiments, a data storage medium is rotated by a motor. A write transducer is used to write concentric data tracks to the storage medium during said rotation. The tracks are provided with variable track widths established by selectively changing a rotational velocity of the medium. The variable track widths can be gradual and/or abrupt, depending on the requirements of a given application. Gradual variations in track width can be used by a linear actuator with a linear translation path to emulate tracks written along a pivot translation path of a rotary actuator. Abrupt variations in track width can be used to provide different zones of tracks having different specified track widths. The tracks may be written using an electron beam recorder (EBR) with a constant write beam power level.

25 Claims, 7 Drawing Sheets

FIG. 15

VARIABLE TRACK WIDTH RECORDING COMPENSATION

RELATED APPLICATION

The present application makes a claim of domestic priority to U.S. Provisional Patent Application No. 61/119,943 filed Dec. 4, 2008, which is hereby incorporated by reference.

BACKGROUND

Data storage devices generally operate to store and/or retrieve data in a fast and efficient manner. Some storage devices utilize a rotatable storage medium which is accessed by a radially moveable transducer to carry out data transfer operations with tracks defined on the medium.

The transducer is often supported by an actuator positioned adjacent an outermost circumference of the medium. Different forms of actuators are known, including linear actuators and pivot (rotary) actuators. The media can store the data in a variety of forms, such as optically (e.g., optical discs), magnetically (e.g., hard disc drives), etc. The media can be prerecorded or recordable (either once or many times).

The configuration of the various tracks on a media surface is usually determined during media or device manufacturing. The tracks can be defined as a series of discrete concentric rings, or as a continuous spiral that extends across the radius of the medium. Depending on the construction of the medium, multiple recording layers may be employed to further increase the data storage capacity of the medium. Usually, both user data content and overhead servo data will be intermittently stored along each track. The user data content (e.g., programming, video, audio, etc.) is output to a host device, whereas the servo data provides closed loop tracking information to a servo system used to position the data transducer.

Track width refers to the overall radial width of the information stored along a given track. Track pitch refers to the radial distance from the center of one track to the next track. It can be seen that track width is related to track pitch. These values will be identical if there is no intervening buffer space between adjacent tracks. Historically, storage media were often provided with consistent track widths (and consistent track pitches); that is, the track width/pitch did not vary across the medium surface, but rather were maintained substantially constant.

SUMMARY

Various embodiments of the present invention are generally directed to a method and apparatus for providing a storage medium with variable track widths.

In accordance with various embodiments, a data storage medium is rotated by a motor. A write transducer is used to write concentric data tracks to the storage medium during said rotation, the tracks having variable track widths established by selectively changing a rotational velocity of the medium.

The variable track widths can be gradual or abrupt, depending on the requirements of a given application. Gradual variations in track width can be used to emulate a pivot translation path of a rotary actuator. Abrupt variations in track width can be used to provide different zones of tracks having different specified track widths.

These and other aspects of various embodiments can be understood from the following detailed discussion in conjunction with the associated drawings.

DETAILED DESCRIPTION

Various embodiments of the present invention are generally directed to the recording of data to a storage medium. The data are arranged as circumferentially extending tracks of variable track width. In some embodiments, the variable track widths are gradual so that successive tracks over at least a portion of the radial extent of the medium successively increase or decrease in radial width. In other embodiments, the variable track widths provide abrupt changes in track width, so that different zones have different track widths/pitches. The variable track widths can be established by varying the rotational velocity of the medium over different rotational passes.

Figure 1:
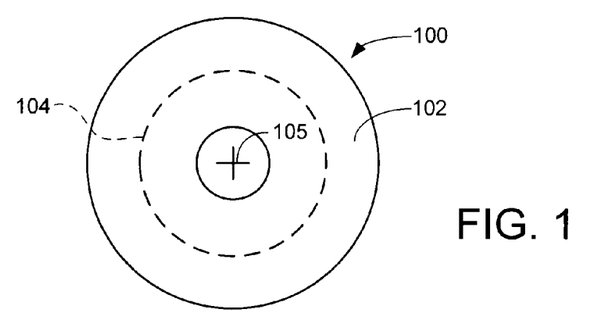
FIG. 1 illustrates an exemplary data storage medium.

FIG. 1 provides a top plan view of an exemplary rotatable data storage medium 100. In presently preferred embodiments, the medium is characterized as a magnetic recording disc such as the type used in a hard disc drive (HDD) so that data are written to the medium in the form of alternating magnetic flux transitions. In other embodiments, the medium takes the form of an optical disc in which data are written to the medium in the form of marks of alternating levels of optical reflectivity, such as in the case of a Blu-Ray disc (BD) or a digital versatile disc (DVD).

Data are arranged on the medium 100 on a recording surface 102 which extends from an innermost diameter (ID) to an outermost diameter (OD) of the medium. The recording surface 102 comprises a number of concentric tracks, one of which is denoted at 104. The tracks circumferentially (angularly) extend about a central axis 105 and can be arranged as a sequence of discrete concentric rings, or part of a continuous spiral that extends from the ID to the OD.

Figure 2:
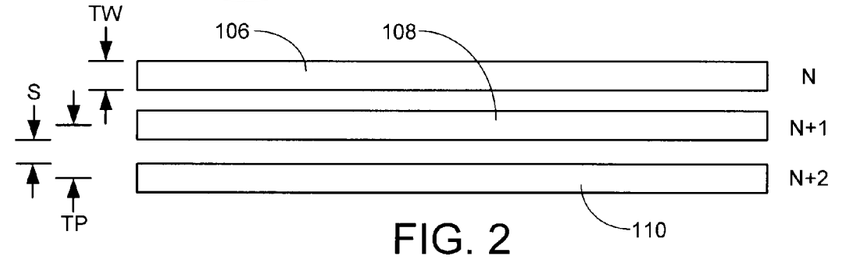
FIG. 2 shows a number of adjacent tracks from the medium of FIG. 1.

FIG. 2 shows three exemplary tracks 106, 108 and 110 from the recording surface 102 of FIG. 1. These tracks are denoted as Tracks N, N+1 and N+2, respectively. Each of the tracks 106, 108, 110 has an associated track width (TW), which generally corresponds to the radial width, or distance, that each track spans the medium 100 in a radial direction that intersects the central axis 105.

The tracks are further provided with an associated track pitch (TP), which generally corresponds to the radial distance from the center of one track to the center of the next track. Small intervening spaces (S) are shown between the adjacent tracks. It follows that:

$$TP=TW+S \qquad (1)$$

It will be noted that in all cases, TP is proportional to TW. As S approaches zero, then TP approaches TW (that is, if S=0, TP=TW). Generally, the extent to which intervening space S is required between adjacent tracks will depend on the manner in which data are stored to the medium. For example, magnetic tracks can abut (or even overlap), in which case reference to track width is synonymous with track pitch. On the other hand, optical discs often need some "white space" on each side of the track to prevent intersymbol interference with the optical detection of the patterns, so that S is non-zero and TP is greater than TW.

For purposes of clarity, reference will be made hereinafter primarily to track width, but it will be understood that similar statements can be made about track pitch based on the foregoing definitions.

Figure 3:
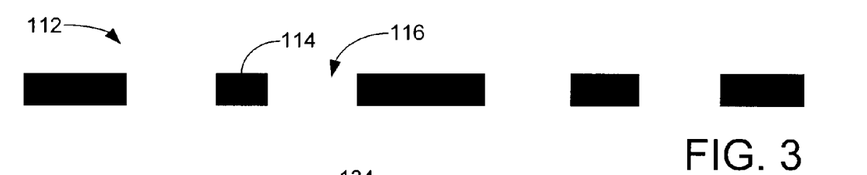
FIG. 3 illustrates an exemplary pattern recorded along a selected track of the medium.

FIG. 3 provides an exemplary pattern 112 recorded to the track 104 in FIG. 1, characterized as a magnetic pattern of alternating magnetic field domains (features). The darkened "black" regions along the pattern, such as denoted at 114, constitutes a first magnetic field domain alignment in a selected direction such as into the page in a perpendicular recording environment. The "white" regions between adjacent black regions, such as denoted at 116, constitute an opposing second magnetic field domain alignment such as extending in a direction out of the page.

Other domain arrangements can readily be utilized including parallel magnetic domains that extend in opposing directions along the track. It will be appreciated that the pattern 112 can alternative represent some other form of transduceable pattern, such as an optical pattern of reflective marks and spaces (pits and lands) of alternating reflectivity. While the marks are rectangular, this is not necessarily required as other shapes such as oval can be used. Data are stored in relation to the transitions between adjacent features; a read transducer may detect a magnetic flux transition or an optical transition from one feature to the next.

Figure 4:
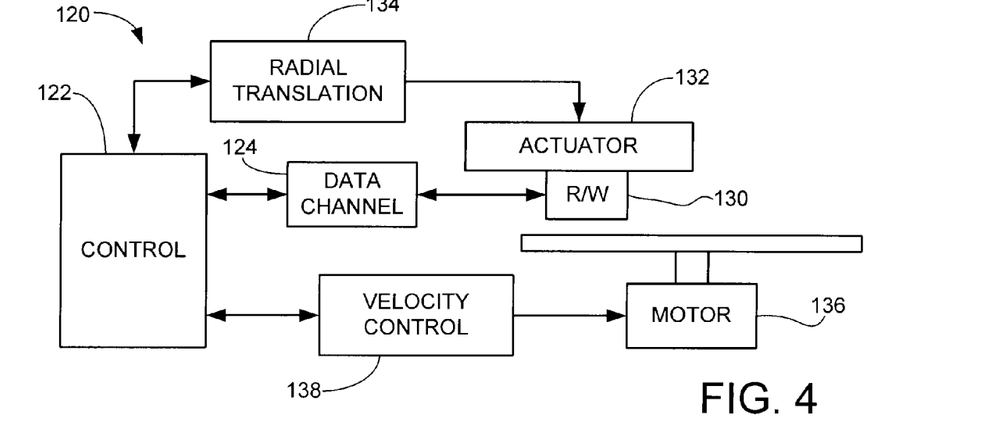
FIG. 4 is a block diagram of a data storage system configured to write data to and read data from the storage medium.

FIG. 4 provides a functional block representation of a data storage system 120 configured to write data to and read data from the storage medium 100 of FIG. 1. The writing of data may result in the formation of a pattern such as exemplified in FIG. 3. The reading of data may result in the generation of a time-varying readback signal with pulse transitions incident with feature boundaries.

Top level control of the data storage system 120 is provided by a controller 122. A data channel 124 provides a data path between a host device (not shown) and a read/write (R/W) transducer 130. Radial movement of the transducer 130 relative to the storage medium 100 is carried out via an actuator 132. Closed loop servo control of the positioning of the transducer 130 is provided by a radial translation circuit 134, also referred to herein as a servo circuit.

The medium 100 is rotated at a selected operational velocity via a motor 136, which is controlled by a velocity control block 138. In some embodiments, the motor 136 rotates at a constant angular velocity (CAV) so that the rotational speed of the motor 136 is nominally constant (e.g., 10,000 revolutions per minute, RPM) irrespective of the radial location of the transducer 130. In other embodiments, the motor 136 rotates the medium 100 at a constant linear velocity (CLV) so that the rotational speed of the motor 136 changes in relation to the radial location of the transducer 130.

As will be appreciated by those skilled in the art, the use of CAV recording will provide symbols (e.g., marks such as 114 in FIG. 3) with physical lengths that vary with respect to radius. For example, using CAV recording will provide a given symbol size (e.g., 3T where T is a channel clock) that is longer if located on a track near the OD of the medium and shorter if located on a track near the ID of the medium. Well known zone-based recording (ZBR) techniques can be utilized as desired to provide concentric zones on the medium with constant data densities (i.e., same number of channel bits per track), thereby increasing data storage density.

CLV recording will provide symbols with nominally the same size (length and width) no matter where the symbol is located on the medium 110. CLV will generally cause the motor 136 to slow down as the transducer 130 moves toward the OD, and will generally cause the motor 136 to speed up as the transducer 130 moves toward the ID. It will be appreciated that the various embodiments described herein can be advantageously utilized in any number of different environments, including both CLV and CAV environments.

In some embodiments, it is contemplated that the transducer 130 constitutes an electron beam recorder (EBR). As will be appreciated by those skilled in the art, an EBR can provide extremely fine exposure features on the medium 100. These features can include servo features to facilitate the definition of tracks, pre-recorded user content data, ATIP type information to define the locations of sectors of user data subsequently recorded to the medium, etc.

In some embodiments, the medium 100 can be initially provisioned with a blank layer of reactive material which is successively exposed to the EBR to provide features on the medium. Such is not limiting, however, since the EBR (or other transducer) can be alternatively configured to expose a layer of photoresist on a master disc which is subjected to subsequent processing to provide features on a population of replicated discs.

Figure 5A:
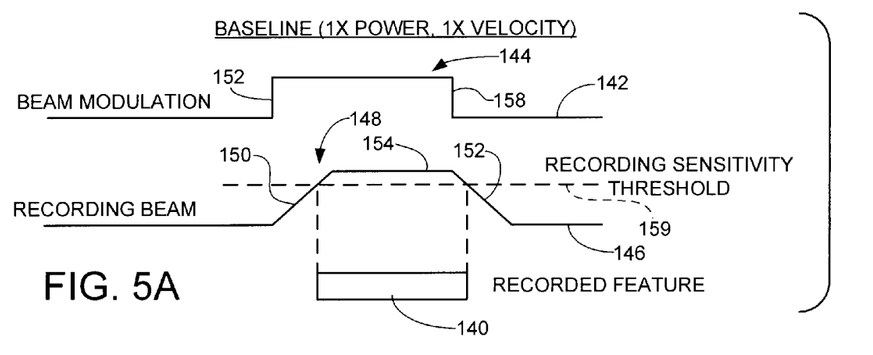
FIGS. 5A-5C show different features recorded to the storage medium by the system of FIG. 4 under different operational settings.
Figure 5B:
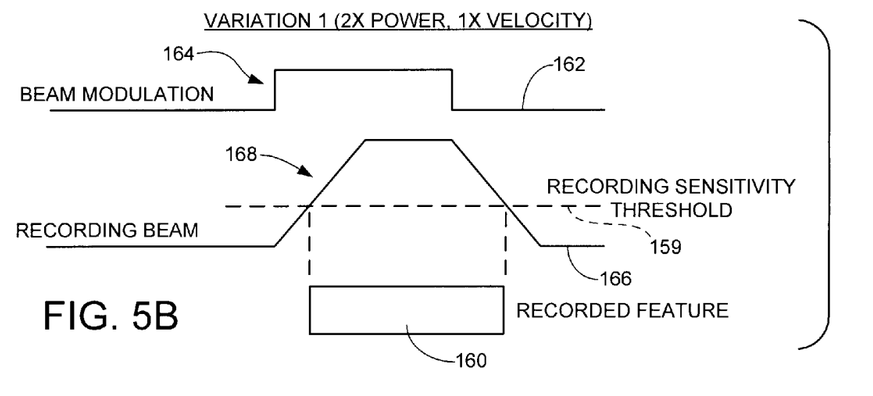
Figure 5C:
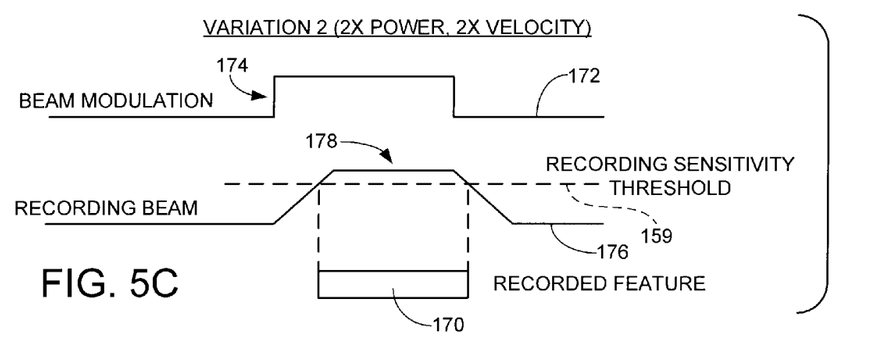

FIGS. 5A-5C generally illustrate differences in feature characteristics that can be achieved under different operational conditions. FIG. 5A shows a first feature 140 written to the medium 100 by the system 124 of FIG. 4 under so-called baseline conditions; that is, while the medium 100 is rotated at a baseline 1× velocity (rate) and while the write transducer 130 is operated at a baseline 1× power output level.

These baseline values are normalized and will vary depending on the requirements of a given application. For reference, it is contemplated that CLV recording is applied so that the 1× rate corresponds to some selected linear velocity for the disc. The 1× power output level corresponds to some value applied to (or output by) the write transducer 130 sufficient to form a feature on the medium.

Continuing with FIG. 5A, a frequency modulated recording beam control signal 142 includes a substantially rectangular pulse 144. The pulse 144 is provided with a duration sufficient to define the length and width dimensions of the recorded feature 140 at the baseline operating conditions (1× velocity, 1× power). The pulse 144 is supplied to the write transducer 130, which provides an associated recording beam response 146 with an output pulse 148. The pulse 144 generally determines how long the beam is on; that is, a high logic level activates the beam, and a low logic level deactivates the beam.

It is contemplated that some latency response will be involved in the response of the write transducer 130. That is, the intensity of the recording beam as it is turned on and off may not be instantaneous, but will rather follow time-varying changes as indicated by the sloped leading and trailing edges 150, 152 of the output pulse 148. The intensity of the beam levels out as indicated by segment 154, and remains at this intensity until the recording beam control pulse 144 transitions low. At this point, the trailing edge 152 of the recording beam output pulse 148 commences and returns the recording beam signal back to the steady state off value.

It is contemplated that the medium 100 may have a recording sensitivity threshold characteristic. This characteristic can be manifested in a number of ways, but generally corresponds to a minimum power level that must be achieved before a recording feature can be formed on the medium. This power level is represented by dashed threshold line 158.

Under these circumstances, unless the power level of the recording beam exceeds the threshold 158, no feature will generally be formed on the medium. Similarly, the length and the width of the feature 140 will be proportional to that portion of the recording beam output pulse 148 that is above the threshold line 158, as depicted in FIG. 5A.

FIG. 5B shows another operational condition of the system 124, referred to herein as a first variation (variation 1). In this first variation, the rotational velocity of the medium is maintained at the baseline 1× value, but the output power of the write transducer 130 is increased by 2× over that in FIG. 5A. This provides a second feature 160 formed by a beam modulation control signal 162 with pulse 164. For purposes of comparison, the signal 162 and pulse 164 in FIG. 5B are nominally identical to the signal 142 and pulse 144 in FIG. 5A.

The recording signal 162 and pulse 164 in FIG. 5B provide a corresponding recording beam output 166 with output pulse 168. The output pulse 168 achieves a substantially higher magnitude above the media sensitivity threshold 158 (which is the same as in FIG. 5A), thereby providing the feature 160 with both a greater width and a greater length as compared to the width of the feature 140. At this point it will be appreciated that the pulse 162 in FIG. 5B could be shortened in duration by a controlled amount so as to provide the wider feature 160 in FIG. 5B with the same overall length as the feature 140 in FIG. 5A.

FIG. 5C shows yet another alternative feature 170 formed under a second variation (variation 2) in which both 2× power and 2× velocity levels are employed. A modulation signal 172 with pulse 174 is applied as before (and is nominally identical to the recording signals/pulses in FIGS. 5A-5B). The recording beam provides a response 176 with output pulse 178. It will be noted that the recorded feature 170 at the 2× power/2× velocity in FIG. 5C is nominally the same in width and length dimensions as the feature 140 written under baseline 1× power/1× velocity conditions in FIG. 5A. This is merely illustrative, as different systems may provide different results.

Overall, it is generally contemplated that significant divergence in one of the two factors of power and velocity will result in significant changes in the associated recorded feature. For example, it is contemplated that larger features over a baseline feature size can be obtained when either the recording power is increased (e.g., from 1× to 1.1×, etc.) or when the medium velocity is reduced (e.g., from 1× to 0.909×, etc.). As will be appreciated, increasing the write power generally results in a longer dwell time above the sensitivity threshold. As disclosed herein, similar advantages can be obtained by slowing down the rotational rate for a given write power, which also results in a longer dwell time above the sensitivity threshold. Continuous deflection of a write beam in a direction along the track over a given revolution may also be used to increase or decrease the dwell time with respect to a given rotational velocity.

Figure 6A:
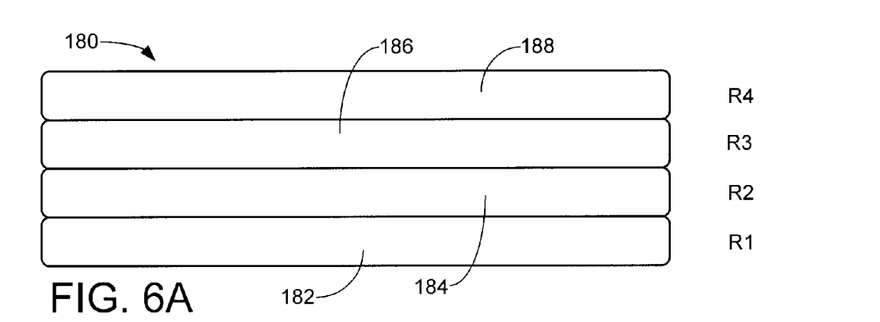
FIGS. 6A-6B show different composite features written over multiple revolutions of the medium using a stitching process in accordance with various embodiments.

FIG. 6A shows a composite feature 180 formed from four individual features 182, 184, 186 and 188. The individual features are each formed during a different medium rotation R1-R4, as shown. In FIG. 6A, each of the features 182, 184, 186, 188 are of the same nominal size (both width and length), and are stitched together to form the overall composite feature 180 with overall desired width and length dimensions. The composite feature may correspond, for example, to a selected mark 114 in FIG. 3.

For reference, it is contemplated that the composite feature 180 is written to the medium 100 by positioning the write transducer 130 at a first desired radius of the medium to write the first feature 182. This first desired radius is identified as R1. When the medium 100 rotates around to align the write transducer 130 with the angular location on the medium where the feature 180 is to be written, an appropriate recording signal (such as 142, 162, 172 in FIGS. 5A-5C) is supplied to the write transducer 130. This results in the application of power to the medium to record the first feature 182.

For the next revolution of the medium, the write transducer is radially advanced to the next radius R2, and at the appropriate time the next recording signal is applied to generate the second feature 184. These steps are repeated for radii R3 and R4 to write features 186, 188. It will be noted that the medium velocity, the recording power, and the recording signal are maintained constant for each of the features 182, 184, 186, 188.

Figure 6B:
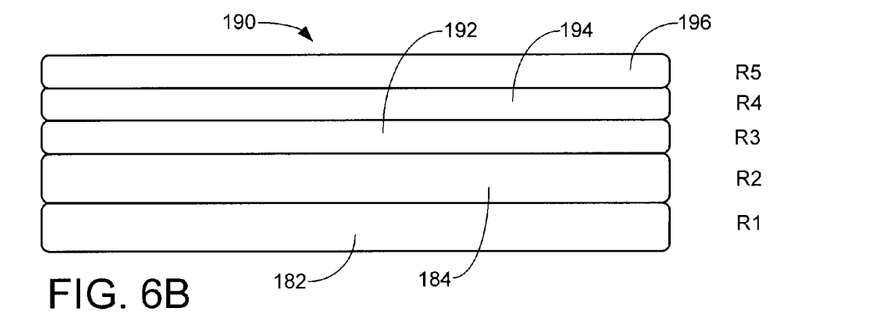

FIG. 6B shows an alternative composite feature 190 formed over a total of five consecutive revolutions R1-R5. The composite feature 190 has overall length and width dimensions that are nominally identical to the length and width dimensions of the feature 180 in FIG. 6A. Unlike the composite feature 180, however, the composite feature 190 is formed of variably sized features, namely two larger features 182, 184 (which are the same as in FIG. 6A) and three smaller features 192, 194 and 196.

The smaller features 192, 194 and 196 are written during respective revolutions during which time either the velocity has been increased and/or the recording power has been decreased as compared to the values used to write the features 182, 184. FIG. 6B thus shows that any number of individually sized features can be written to a medium as desired to generate individual or composite features. While the composite features of FIGS. 6A and 6B provide respective track widths TW of the same size, it will be appreciated that individual or composite features can be generated to meet the requirements of substantially any desired track width.

Figure 7A:
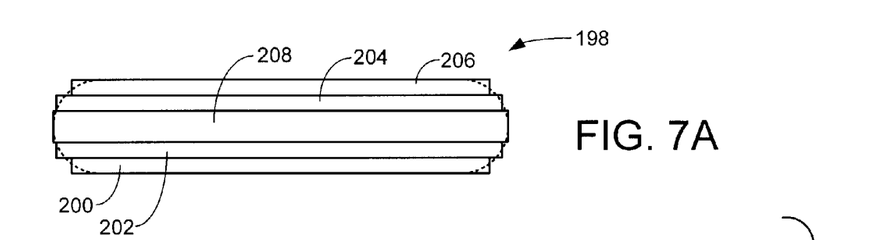
FIGS. 7A-7B show other exemplary composite features.

FIG. 7A shows a composite feature 198 formed from a number of individual features 200, 202, 204, 206 and 208. The features 200-206 have a first uniform width and the feature 208 has a second, larger width. The features are individually tailored to substantially correspond to an oval shape (represented by dotted outline). Greater resolution could be achieved by using a larger number of individual features of smaller size. Any number of features can be used as desired, including just a single feature (i.e., the symbol is written over a single revolution and not stitched together from multiple passes). Any number of different features shapes, such as rectangular, oval, etc., can be formed as desired.

Figure 7B:
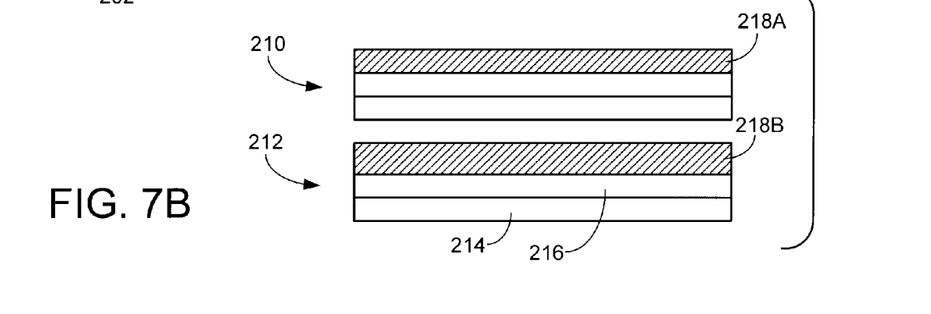

FIG. 7B shows features 210, 212 arranged on adjacent tracks. These features are each provided with two base features 214, 216 of common width and length. Variable length features 218A, 218B (shown in cross-hatch) are provided having different widths. These variable length features 218A-B allow the tracks to be provided with gradually changing track widths.

Figure 8:
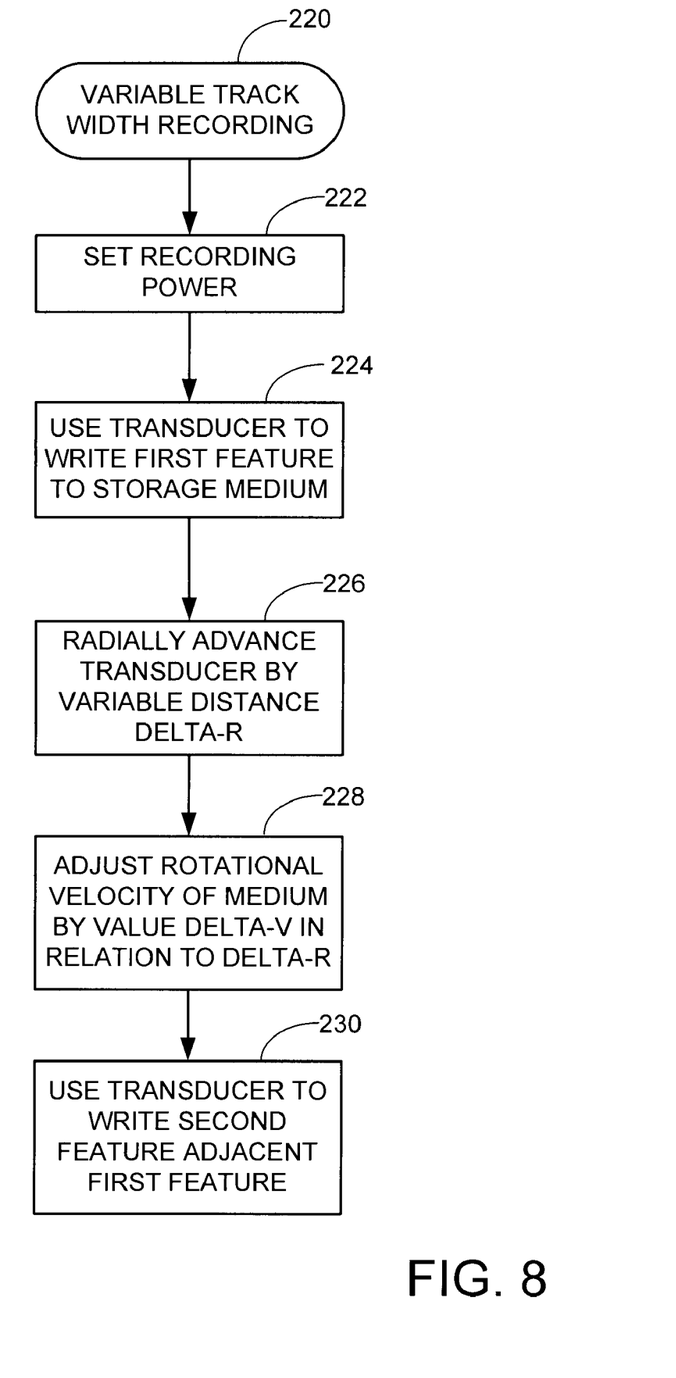
FIG. 8 is a flow chart for a VARIABLE TRACK WIDTH RECORDING routine.

Some types of writing systems, such as laser beam recorders (LBRs), can be configured to apply different power (dosage) levels. Other types of writing systems, however, such as some types of electron beam recorders (EBRs), do not have the capability of easily changing the power levels. Accordingly, FIG. 8 provides a flow chart for a VARIABLE TRACK WIDTH RECORDING routine 220, generally illustrative of steps carried out in accordance with some embodiments of the present invention to define tracks on a storage medium such as 100 in FIG. 1 in an environment where on-the-fly changes to write beam power levels are unavailable or impractical.

At step 222, a recording power level for a write transducer (such as 130) is initially selected. While not necessarily limiting, it is contemplated that a constant write power will be used for the write transducer during the entirety of the routine 220. Thus, variations in feature size will be effected by changes in the rotational velocity of the medium and by changes to the shape and duration of the input recording signals while using a baseline, nominally constant write power level. An initial rotational velocity for the medium is also selected at step 222. The velocity during the writing operation may be in accordance with a baseline CAV or CLV writing profile.

The write transducer is next used at step 224 to write a first feature to the storage medium. This first feature can be any suitable feature such as shown in FIGS. 3, 5A-5C and 6A-6B. For purposes of the present discussion, this first feature will be contemplated as comprising the feature 184 in FIG. 6B, written at a first radial location R2.

Once the first feature is written, the routine passes to step 226 where the write transducer is radially advanced by a variably selectable radial distance ΔR to a new radial location (in this case R3, where ΔR=R3−R2). As desired, the rotational velocity of the medium is similarly adjusted by a value of ΔV from the initial velocity V1 to a second velocity V2 at step 228. The ΔV value is selected in relation to the ΔR value, and constitutes a value ΔV=V2−V1.

A second feature is next written at step 230 using the ΔR and ΔV values; for purposes of the present discussion, this second feature is contemplated as comprising the smaller feature 192 in FIG. 6B. While the routine 220 of FIG. 7 depicts the writing of just two adjacent features, it will be appreciated that the routine passes back through as many successive times as required to write all of the desired features to the medium. The features can be composite features so that multiple features are adjoined together to form a larger feature, as generally depicted in FIGS. 6A-6B. Alternatively, the features can be single features that individually span the desired track width, such as generally depicted in FIG. 3.

Because the second feature 192 in FIG. 6B is smaller than the first feature 184 in FIG. 6B, it will be appreciated that the ΔV value of step 208 in the foregoing discussion would generally constitute an increase in rotational velocity, such as 1.1× or so (e.g., V2=(1.1)(V1)). Other adjustments could readily be made, including adjustments wherein the second feature is larger than the first feature.

Figure 9A:
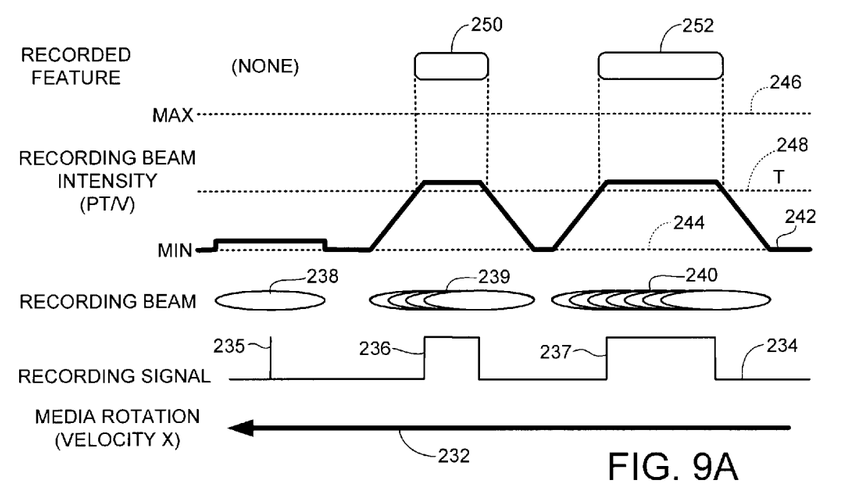
FIGS. 9A-9B show how different track widths can be established by adjusting the rotational velocity of the medium in accordance with the routine of FIG. 8.
Figure 9B:
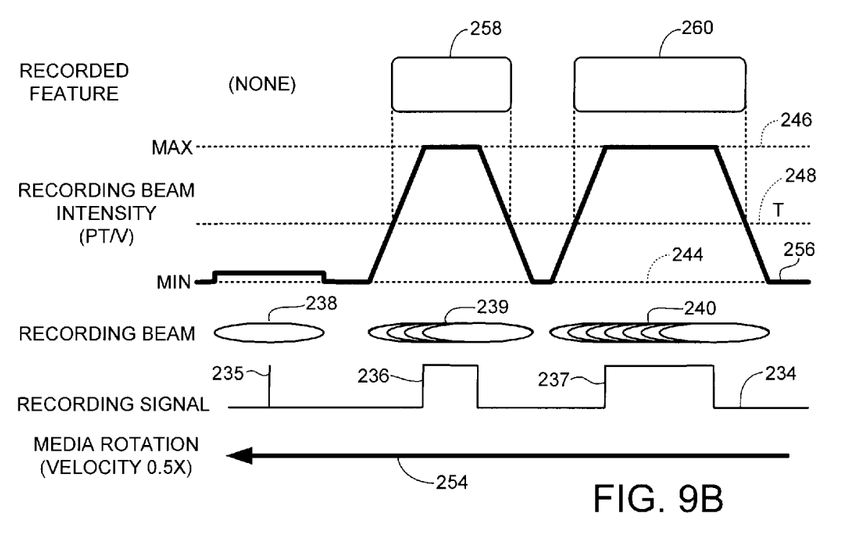

FIGS. 9A and 9B illustrate different features that can be written by the routine of FIG. 8. The medium is rotated by a motor in a selected direction relative to a write transducer at a first rotational velocity X as indicated by arrow 232. A recording signal 234 is provided indicative of the data content to be stored to the medium. The recording signal 234 includes three spaced-apart pulses 235, 236 and 237. Pulse 235 is a delta-pulse of exceedingly short duration.

Recording beam exposure footprints are represented at 238, 239 and 240. The footprints are generated in response to the pulses 235, 236 and 237 using a beam modulation signal (not separately shown) and represent the areal extent of the medium upon which the write beam impinges as the medium rotates adjacent the write transducer.

Activation of the beam will expose a selected area of the medium which in this case is a generally oval area, although other beam impingement patterns are contemplated. The beam may be held continuously on or may be pulsed at an extremely high frequency. As the medium rotates, the area exposed to the beam will become elongated. Footprint 238 represents a minimum amount of exposure area, and footprints 239, 240 are depicted as multiple overlaid exposure areas.

A recording beam intensity level is shown at 242. The level is similar to the intensity levels discussed previously in FIGS. 5A-5C and represents a dosage amount of the irradiated beam applied to the medium. The dosage D can generally be expressed as:

$$D=K(PT/V) \tag{2}$$

where P represents the power level of the write beam, T is the duration of time the beam impinges the medium, V is the velocity of the medium, and K is a constant.

The beam intensity level 242 extends between a minimum (MIN) level 244 and a maximum (MAX) level 246. A threshold (T) level 248 corresponds to the aforementioned medium sensitivity threshold. Dosage levels below this threshold will not result in the recording of a feature or otherwise alter the medium. It will be appreciated that some types of media may not have this threshold, or have a threshold that is substantially at the MIN level 244. For some types of recordable optical media that utilize impingement of a read beam to transduce data, care may be taken to ensure the readback signal is maintained below this threshold so as to not inadvertently overwrite the existing data.

It can be seen that the beam intensity established by the recording beam footprint 238 is insufficient to write a feature to the medium. On the other hand, the beam intensities established by the beam footprints 239, 240 are sufficient to write features 250, 252. The features 250, 252 have lengths established in relation to the dwell time at which the beam intensity level 242 is above the sensitivity threshold 248. The features 250, 252 have widths established in relation to the relative magnitude of the beam intensity level 242 above the threshold 248.

FIG. 9B shows another recording operation upon the same medium. In FIG. 9B, all of the parameters are the same as in FIG. 9A except that the rotational velocity of the medium is reduced. Arrow 254 indicates media rotation direction at a velocity of 0.5×, so that the velocity of the medium in FIG. 9B is ½ that of FIG. 9A. Some other velocity scaling may result in these respective values, so the use of a velocity reduction of 50% is merely illustrative and not limiting.

As before, data pulses 235, 236 and 237 result in exposure footprints 238, 239 and 240. The areal sizes of the exposure footprints are the same in both FIGS. 9A and 9B. Because the medium is only rotating half as fast, the dwell time of the exposure beam in FIG. 9B will be twice as long as that in FIG. 9A. This provides a significantly greater intensity of the beam upon the medium, as indicated by beam intensity level 256. The intensity of the first footprint 238 is still insufficient to result in the formation of a feature on the medium. The footprints 239 and 240, however, respectively form features 258, 260. The features 258, 260 are both longer (in a direction along the track) and wider (in a direction across the track) than the features 250, 252.

Figure 10:
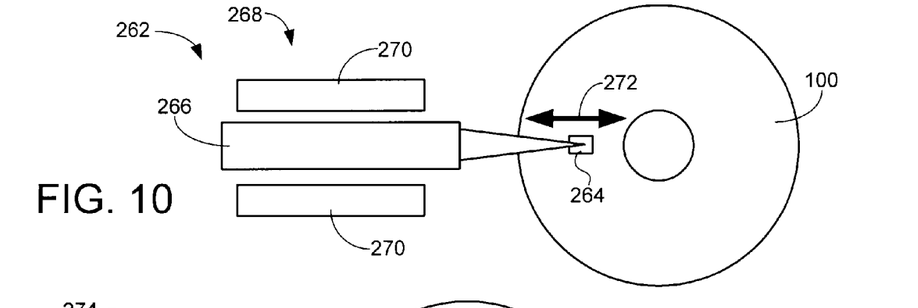
FIG. 10 represents a linear actuator.

The different feature sizes of FIGS. 9A-9B can be used to compensate for data written using different actuator geometries. FIG. 10 represents a linear actuator 262 which supports a transducer 264. The actuator 262 utilizes a linear voice coil motor (VCM) or similar arrangement with a coil 266 and a magnetic assembly 268 comprising permanent magnets 270. Application of current to the coil 266 causes linear movement of the coil relative to the magnetic field of the magnetic assembly 268, resulting in linear translation of the transducer 254 across a radius of the medium 100 along a linear translation path 272.

Figure 11:
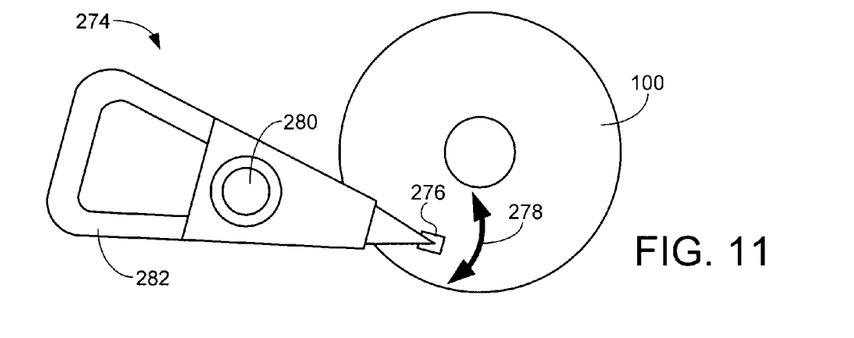
FIG. 11 illustrates a pivot (rotary) actuator.

FIG. 11 provides a rotary actuator 274 which supports a transducer 276 adjacent the medium 100. The transducer 276 is moved along a rotary (pivot translation) path 278 across the medium 100 by rotation of the actuator 274 about a pivot axis 280. Rotation of the actuator 274 is induced by application of current to a VCM coil 282, which interacts with a corresponding magnetic circuit (not shown).

Figure 12:
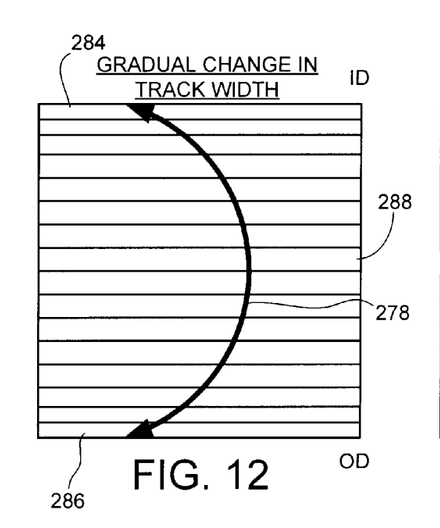
FIG. 12 shows variable track widths on a medium with gradual changes in track width to accommodate a pivot translation path.

The pivot translation path 278 taken by the transducer 276 in FIG. 11 can provide gradual changes in track width such as illustrated in FIG. 12. FIG. 12 is a simplified representation of concentric tracks that radially extend across a storage medium. Track 284 is located near an innermost diameter (ID), track 286 is located nearest an outermost diameter (OD), and track 288 is located near a medial portion of the medium recording area.

It can be seen that tracks 282, 284 have the smallest track widths, and track 288 has the largest track width. The track widths gradually increase from the respective ID and OD toward the medial portion of the recording area in relation to the radial translation geometry 278. This is due at least in part to the respective skew angles of the transducer 276 relative to the medium at these different locations.

Accordingly, in some embodiments a write transducer affixed to a linear actuator such as depicted in FIG. 10 can be configured to provide variable width tracks for subsequent use in a reader (or read/write) system with a rotary actuator as shown in FIG. 11. That is, through the use of variable track width adjustments as described herein, a linear actuator can emulate the data pattern that would be generated if the data were normally written using a pivot actuator. Similarly, the variable track width adjustments can be used by a first pivot actuator with a first translation geometry to provide the medium with data arranged in accordance with a different, second translation geometry. The track width adjustments can also be used by a pivot actuator to emulate a linear track width pattern.

Figure 13:
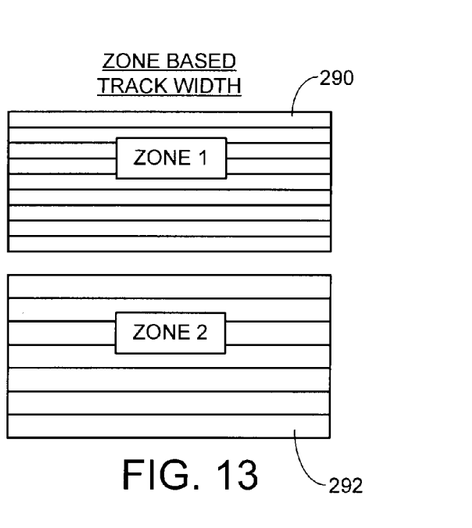
FIG. 13 illustrates variable track widths on a medium with abrupt changes in track width to accommodate different zones with different track widths and/or pitches.

It may be desirable to provide a storage medium with zone based track widths. For example, the medium may be characterized as a Blu-Ray disc (BD) with different zones having different track widths and/or pitches. FIG. 13 depicts a portion of a zone based storage medium with a first zone of tracks (Zone 1) with tracks 290 each having a first, relatively smaller track width. A second zone of tracks (Zone 2) has tracks 292 each having a second, relatively larger track width. It can be seen that the routine of FIG. 8 can be readily adapted to provide such zone based tracks on a storage medium with either a rotary or linear actuator.

Figure 14:
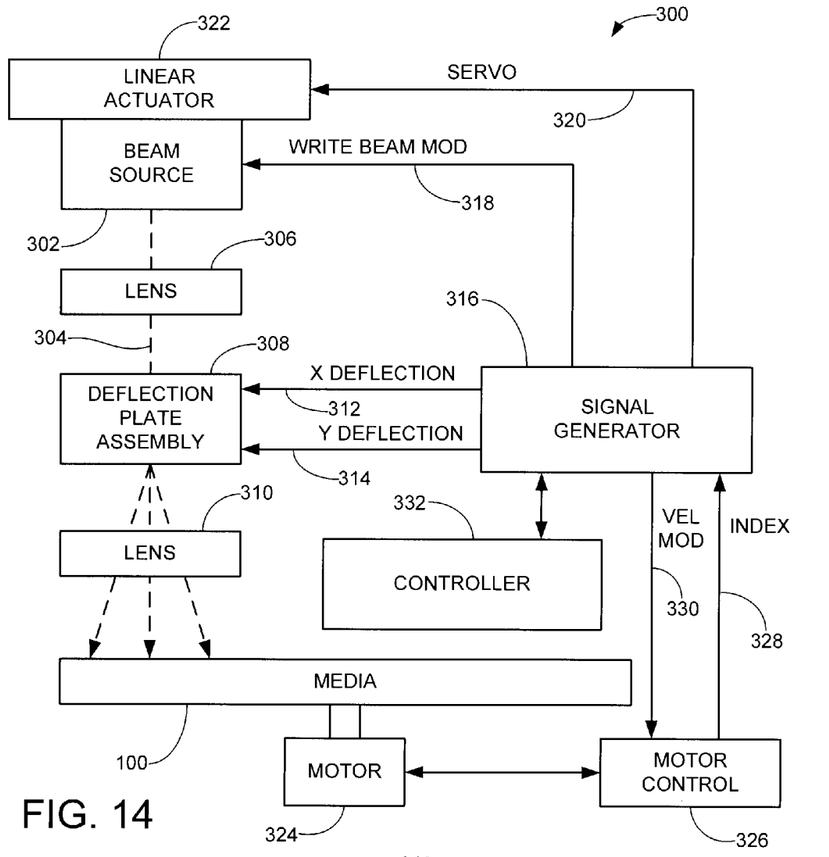
FIG. 14 is a functional block diagram for an exemplary electron beam recorder (EBR).

FIG. 14 shows a functional block diagram of an electron beam recorder (EBR) 300 that can be used in accordance with the foregoing embodiments to write data patterns to a medium. As will be recognized by those skilled in the art, an EBR operates to generate a write beam comprising a stream of electrons. The write beam impinges the associated medium to write a pattern thereto. The interaction of the beam with the medium may be magnetic, chemical, dye reactive, etc. Other types of write beams are contemplated, so the EBR 300 in FIG. 14 is merely illustrative and not limiting.

A beam source 302 generates a write beam (denoted by broken line 304). The write beam 304 is passed through an upper lens assembly 306, adjacent a deflection plate assembly 308, and through a lower lens assembly 310 to impinge upon the medium 100. The deflection plate assembly 308 imparts controlled deflection of the beam 304 along respective X and Y directions, with X being along the length of a track and Y being in a radial direction across the track.

The deflection plate assembly 308 can be arranged as respective pairs of parallel plates disposed on opposing sides of the beam path. The application of controlled voltage signals, as indicated by the X deflection and Y deflection signals on paths 312 and 314, impart a controlled displacement of the axial path of the write beam 304. Although not shown, a closed loop detection mechanism can be employed to ensure the desired amount of beam deflection is obtained in response to a given desired input.

The X and Y deflection signals are generated by a signal generator block 316. The signal generator block 316 also generates a write beam modulation signal which is provided on path 318 to the beam source 302 to modulate (turn on/off) the write beam 304, as discussed above. The signal generator 316 further provides servo control signals on path 320 to a linear actuator 322 to linearly advance the head assembly beam source 302 across the medium.

Rotational velocity of a motor 324 is provided by a motor control circuit 326. In some embodiments, the motor control circuit 326 can provide a once-per-revolution index signal to the signal generator, as indicated by path 328. A velocity modulation signal indicative of the desired rotational velocity of the medium is generated by the signal generator 316 and supplied via path 330 to the motor control circuit 326. A controller 332 provides top level control of the EBR 300.

Figure 15:
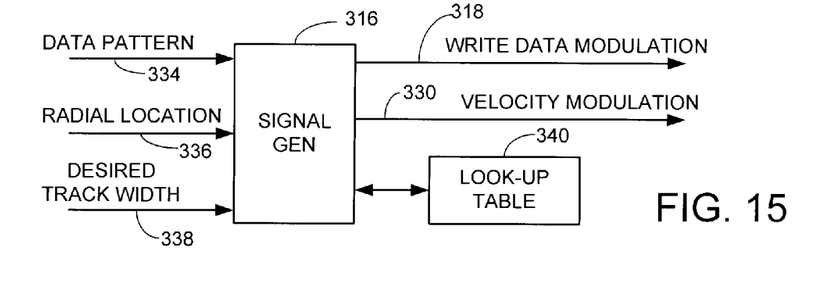
FIG. 15 illustrates the signal generator block of FIG. 14.

Exemplary operation of the signal generator 316 to write variable track pitch features is illustrated in FIG. 15. In some embodiments, the signal generator 316 utilizes several signals including the particular data pattern to be written (path 334), the radial location of the beam source 302 (path 336) and the desired track width (338) to generate the appropriate write beam and velocity modulation signals.

Writing a given symbol length at a particular radial location on the medium with a particular desired track width may require consideration of a number of factors, such as the relative length of the symbol (e.g., 3T, 14T, etc.), how many passes should be taken to write the feature; what radial adjustments should be made for each pass; what rotational velocity should be used on each pass; what adjustments should be made in time to the write beam modulation to ensure the resulting features have the desired X and Y dimensions; and, in cases where the write power can be adjusted, what write power level should be applied by the write beam. As desired, a look-up table 340 can be generated to store compensation values that can be retrieved to generate the appropriate write beam and velocity modulation signals for a desired track width (and/or track pitch). The compensation values can be calculated or determined empirically.

Multiple possible solutions may exist for the writing of a given symbol length with a selected track width at a particular radial location. In cases where multiple possible solutions exist, other factors may influence the decision on how to parametrically configure the system, such as which solution can be written more efficiently.

In some embodiments, when the recording track width (and/or pitch) is to be varied from one rotation to the next, the signal generator 316 may measure the difference and direction of track width from a first rotation to a second rotation. The recording power will be maintained constant over both rotations, and the rotational velocity will be adjusted over the second rotation relative to the first rotation using a compensation value that is related to the measured difference and direction of the track width (and/or pitch).

It is contemplated in the foregoing embodiments that the required velocity adjustments will be made on a per-rev basis, so that for a given pass, all of the features written during that pass will be written at the same rotational velocity of the medium. This is not necessarily limiting. In other embodiments, depending on the response and control capabilities of the motor and the motor control circuit, adjustments in the rotational velocity of the medium may be made during a given rotation so that along a given track, a first feature is written at a first velocity and a second feature is written at a different second rotational velocity. For example, it may desirable to write the feature 250 in FIG. 9A and the feature 258 in FIG. 9B during the same pass along the same track.

In view of the foregoing discussion, it will now be appreciated that various embodiments disclosed herein can provide a number of benefits. Features of substantially any desired dimension, including angular and radial dimensions (e.g., length and width), can be readily obtained by adjusting the velocity and/or the write power. Any number of suitable techniques can be utilized to provide the requisite closed loop velocity control, including but not limited to once-around signals, the use of separate clock tracks, etc.

While features have been shown to be written in a single radial direction (e.g., from OD to ID or vice versa), such is not necessarily required; for example, in some embodiments spaced apart features can be first written, followed by the writing of intervening features therebetween. These and various other variations and alternatives will immediately occur to the skilled artisan in view of the foregoing discussion. Composite features have been shown to abut through the use of a stitching process (e.g., the individual features are "stitched" together to form a larger feature such as in FIGS. 6A-6B). It will be appreciated that a trimming process can additionally or alternatively be employed.

During a trimming process, a first feature may be written during a first pass, and then a portion of the radial width of that feature may be overwritten during a subsequent pass with a second feature to reduce the effective size of the first feature. This may be more feasible to carry out when writing magnetic domains than optical domains. For example, a first feature may be written with a first magnetic orientation and then trimmed using a second feature with an opposing second magnetic orientation. Such trimming can also be used with variable feature widths as described herein.

In some embodiments, the storage medium 100 constitutes a recordable storage medium, such as a magnetic disc installed into a disc drive or a portable optical disc that can be played by a DVD or BD reader. In other embodiments, the storage medium 100 is a master substrate from which a population of replicated copies are subsequently produced. For example, the master substrate may be utilized in a patterning/printing system to replicate the magnetic domain patterns to a population of individual discs which are then installed into individual disc drives. The master substrate may alternatively be used to form a series of stampers which are subsequently used in an injection molding process to form replicated optical discs which can be packaged and sold.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
rotating a data storage medium about a central axis by a motor coupled to the medium; and
using a write transducer to write concentric data tracks to the storage medium during said rotation, the tracks having variable track widths established by selectively changing a rotational velocity of the medium, each track width constituting an overall radial distance that the associated track spans the medium in a direction that intersects the central axis.

2. The method of claim 1, wherein the using step comprises writing a first feature to the medium during a first rotation of the medium while the medium is rotated at a first rotational velocity and the write transducer is positioned at a first radial location, and writing a second feature to the medium during a second rotation of the medium while the medium is rotated at a different second rotational velocity and the write transducer is positioned at a second radial location.

3. The method of claim 2, wherein the first feature and the second feature are stitched together in contacting abutment to form a composite feature having a selected radial width along a selected track.

4. The method of claim 2, wherein the first feature is located on a first concentric track with a first track width, the second feature is located on an adjacent second concentric track with a different second track width, and wherein the second track width is established in relation to a difference between the second rotational velocity and the first rotational velocity.

5. The method of claim 1, wherein the using step comprises determining a difference and direction of track width from a first rotation to a second rotation, and while maintaining a recording power level of the write transducer at a constant value, writing a first feature during the first rotation at a first rotational velocity and a second feature during the second rotation at a different second rotational velocity, the second rotational velocity different from the first rotational velocity by an interval selected in relation to said difference and direction of track width.

6. The method of claim 1, wherein the write transducer is supported by a linear actuator which radially advances the write transducer along a linear translation path across the medium, and wherein the using step comprises writing concentric tracks of data to the storage medium having a variable track width corresponding to a pivot translation path across the medium so that at least a portion of the tracks have track widths that successively increase in track width from one track to the next in a selected radial direction toward an innermost diameter or an outermost diameter of the medium.

7. The method of claim 6, further comprising:
forming a second data storage disc with a track layout that matches the data storage disc processed by the using step; and
installing the second data storage disc adjacent a rotary actuator having said pivot translation path.

8. The method of claim 1, wherein the using step comprises stitching together a plurality of adjacently written features written at different rotational velocities of the medium to form a composite feature on a selected track with a first track width.

9. The method of claim 8, wherein the using step further comprises stitching together a second plurality of adjacently written features written at different rotational velocities of the medium to form a second composite feature to an adjacent second selected track having a second track width different from the first track width.

10. The method of claim 1, wherein the write transducer is characterized as a beam source of an electron beam recorder (EBR), and wherein the EBR writes concentric data tracks to the storage medium with different track widths established by changes in rotational velocity of the medium.

11. A data storage medium formed in accordance with the method of claim 1.

12. The method of claim 1, wherein the data storage medium is characterized as a master substrate, and wherein the method further comprises a step of generating a population of replicated media copies from the master substrate.

13. The method of claim 1, in which the using step comprises maintaining the the write transducer at a constant write beam power level during the writing of the concentric data tracks to the storage medium.

14. An apparatus comprising:
a motor which rotates a data storage medium about a central axis;
a write transducer which radially advances across the data storage medium and applies a write beam to write features to the medium; and
a control circuit which directs the write transducer to write concentric data tracks to the storage medium during rotation of the medium by the motor, the control circuit selectively changing rotational velocity of the medium over different rotations thereof to provide the tracks with variable track widths, each track width constituting an overall radial distance that the associated track spans the medium in a direction that intersects the central axis.

15. The apparatus of claim 14, wherein the control circuit comprises a signal generator circuit which generates a write beam modulation signal to modulate a write beam of the write transducer and a velocity modulation signal to modulate a rotational velocity of the motor in relation to a desired track width profile for the storage medium.

16. The apparatus of claim 14, wherein the write transducer writes a first feature to the medium during a first rotation of the medium while the medium is rotated at a first rotational velocity and the write transducer is positioned at a first radial location, and wherein the write transducer writes a second feature to the medium during a second rotation of the medium while the medium is rotated at a different second rotational velocity and the write transducer is positioned at a second radial location.

17. The apparatus of claim 16, wherein the first feature and the second feature are stitched together in contacting abutment to form a composite feature having a selected radial width along a selected track.

18. The apparatus of claim 16, wherein the first feature is located on a first concentric track with a first track width, the second feature is located on an adjacent second concentric track with a different second track width, and wherein the second track width is established in relation to a difference between the second rotational velocity and the first rotational velocity.

19. The apparatus of claim 14, wherein the control circuit determines a difference and direction of track width from a first rotation to a second rotation, and while maintaining a recording power level of the write transducer at a constant value, directs the transducer to write a first feature during the first rotation at a first rotational velocity and a second feature during the second rotation at a different second rotational velocity, the second rotational velocity different from the first rotational velocity by an interval selected in relation to said difference and direction of track width.

20. The apparatus of claim 14, further comprising a linear actuator which advances the write transducer along a linear translation path across the medium, the control circuit directing the writing of concentric tracks of data to the storage medium having a variable track width corresponding to a pivot translation path across the medium so that at least a portion of the tracks have track widths that successively increase in track width from one track to the next in a selected radial direction toward an innermost diameter or an outermost diameter of the medium, the pivot translation path matching a second pivot translation path of a reader system which subsequently directs a read transducer radially across the medium.

21. The apparatus of claim 14, wherein the write transducer is characterized as a beam source of an electron beam recorder (EBR), and wherein the EBR writes concentric data tracks to the storage medium with different track widths established by changes in rotational velocity of the medium.

22. An apparatus comprising:
a motor which rotates a data storage medium about a central axis;
a write transducer which applies a write beam to the medium during said rotation; and
a control circuit which radially radially advances the write beam across the medium during said rotation to write a plurality of concentric tracks having different track widths formed responsive to adjustments by the control circuit to the rotational velocity of the medium, wherein each track width constitutes an overall radial distance spanned by the associated track across the medium along a direction intersecting the central axis.

23. The apparatus of claim 22, in which the control circuit operates to direct the write transducer to write a first feature on a first track of the medium while rotating the medium at a first rotational velocity, to radially advance the transducer a selected radial distance, to adjust the rotational velocity of the medium to a different, second rotational velocity, and to write a second feature to the first track adjacent the first feature while the medium rotates at said second rotational velocity.

24. The apparatus of claim 23, in which the first feature has a first radial width and the second feature has a different second radial width, and the first and second features are stitched together.

25. the apparatus of claim 22, in which the control circuit maintains the write transducer at a constant write beam power level during the writing of the respective first and second features.

* * * * *

UNITED STATES PATENT AND TRADEMARK OFFICE
CERTIFICATE OF CORRECTION

| | | |
|---|---|---|
| PATENT NO. | : 8,300,345 B2 | Page 1 of 1 |
| APPLICATION NO. | : 12/631503 | |
| DATED | : October 30, 2012 | |
| INVENTOR(S) | : Douglas M. Carson | |

It is certified that error appears in the above-identified patent and that said Letters Patent is hereby corrected as shown below:

In Col. 14, line 38
replace "which radially radially advances"
with "which radially advances"

Signed and Sealed this
Eighth Day of January, 2013

David J. Kappos
*Director of the United States Patent and Trademark Office*